(12) United States Patent
Ausserlechner

(10) Patent No.: US 7,565,602 B2
(45) Date of Patent: Jul. 21, 2009

(54) MEMORY ERROR DETECTION DEVICE AND METHOD FOR DETECTING A MEMORY ERROR

(75) Inventor: Udo Ausserlechner, Villach (AT)

(73) Assignee: Infineon Technologies AG, Munich (DE)

( * ) Notice: Subject to any disclaimer, the term of this patent is extended or adjusted under 35 U.S.C. 154(b) by 547 days.

(21) Appl. No.: 11/278,886

(22) Filed: Apr. 6, 2006

(65) Prior Publication Data

US 2008/0040652 A1 Feb. 14, 2008

(30) Foreign Application Priority Data

Apr. 7, 2005 (DE) .................. 10 2005 016 050

(51) Int. Cl.
*H03M 13/00* (2006.01)
(52) U.S. Cl. .................. 714/807; 714/763
(58) Field of Classification Search .......... 714/804, 714/763
See application file for complete search history.

(56) References Cited

U.S. PATENT DOCUMENTS

| 4,103,823 | A | 8/1978 | Aichelmann, Jr. et al. ... 235/312 |
| 2004/0117723 | A1 | 6/2004 | Foss .................. 714/805 |
| 2004/0208058 | A1* | 10/2004 | Narche .................. 365/185.04 |

* cited by examiner

*Primary Examiner*—Guy J Lamarre
(74) *Attorney, Agent, or Firm*—Eschweiler & Associates, LLC

(57) ABSTRACT

A memory error detection device for a memory having cells arranged in memory rows and columns, wherein the memory is occupied such that the protection memory row or column has a predetermined reference parity value in a state of integrity, the parity value is chosen so that a row or column error signaling a write-protected state of the memory also results in the reference parity value, with a binary value memory reader of the protection memory row or column. The memory error detection device includes a comparing device designed to calculate a test parity value for the memory values of the protection memory row or column read out and to compare it with a reference parity value expected for the protection memory row or column. The memory error detection device includes a detector designed to take an error measure when the test parity value does not match the reference value.

18 Claims, 7 Drawing Sheets

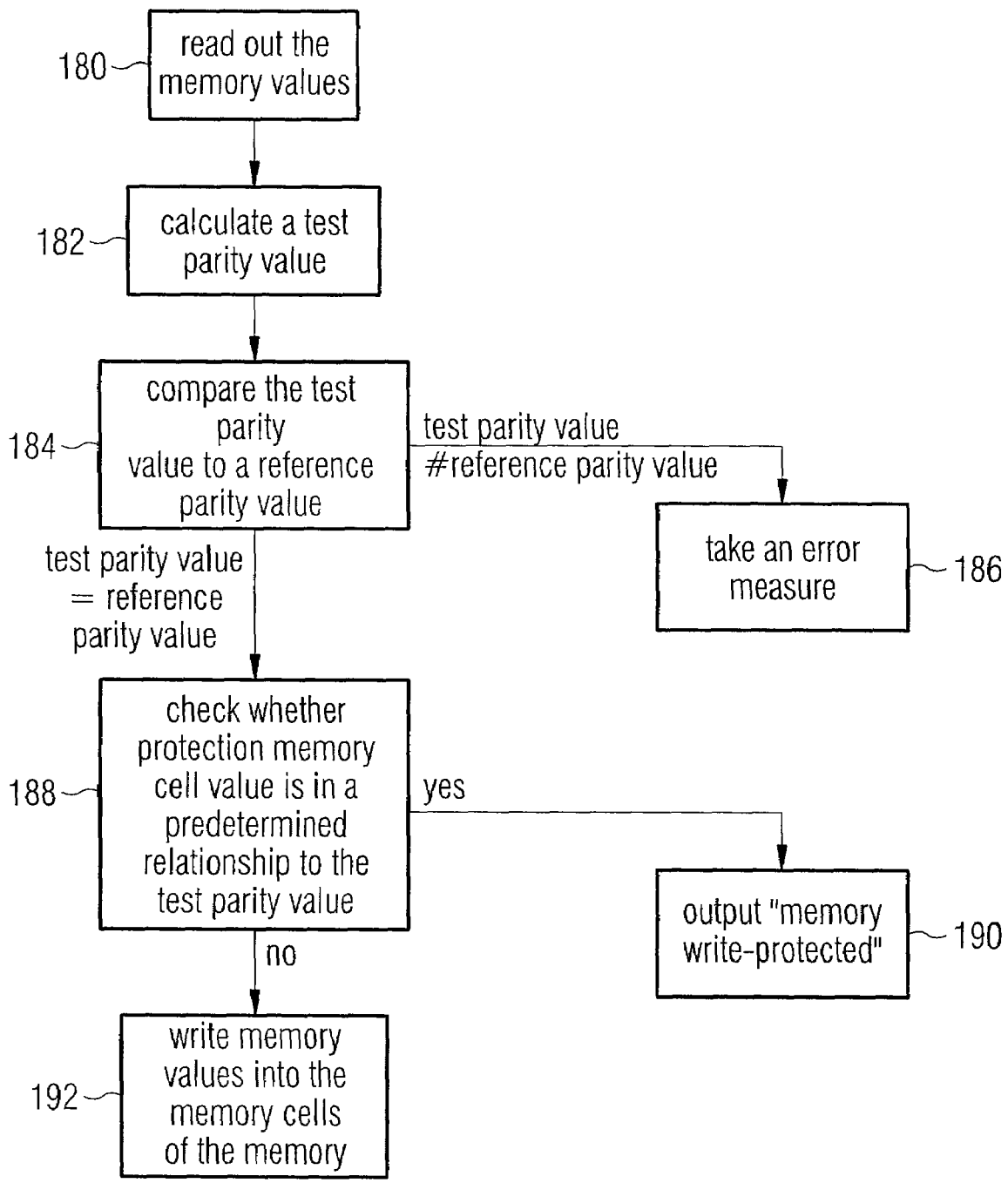

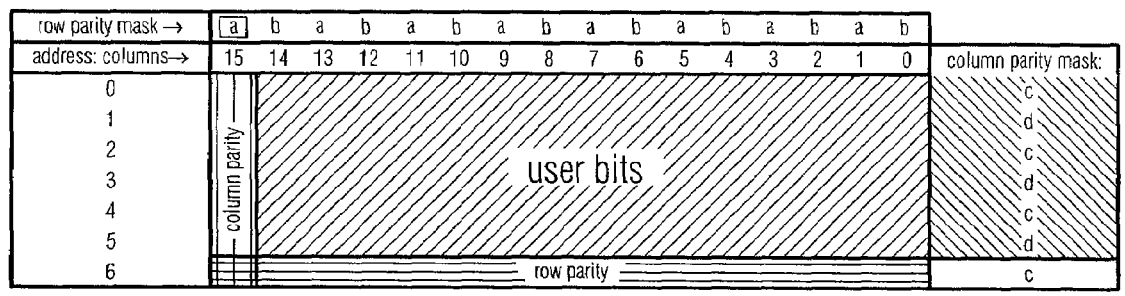

1st case: even column number (e.g. 0 ...15) odd row number (e.g. 0 ...6):
☐ = odd a ⊕ even b
▨ = odd c ⊕ odd d
→
|odd a ⊕ even b| ⊕ | c | =?= |odd c ⊕ odd d| ⊕ | a |
→
even a ⊕ even b =?= even c ⊕ odd d
This equation is satisfied for d="0". Then c="1".
Both a="1" AND b="0" and a="0" AND b="1" are possible.
→ for odd rows and even columns, the parity mask in the parity row must be "1".

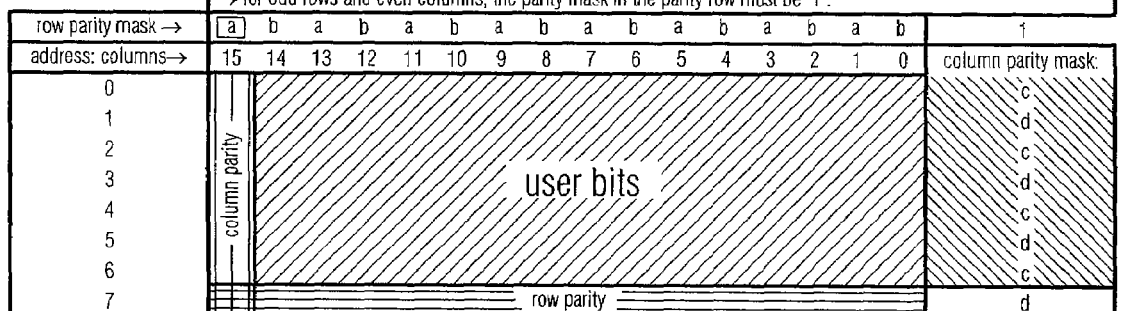

2nd case: even column number (e.g. 0 ...15) even row number (e.g. 0 ...7):
☐ = odd a ⊕ even b
▨ = even c ⊕ odd d
→
|odd a ⊕ even b| ⊕ | d | =?= |even c ⊕ odd d| ⊕ | a |
→
even a ⊕ even b =?= even c ⊕ even d
This equation is always satisfied.
For even column and row numbers, there is no constraint for the alternating parity masks.

FIG 5
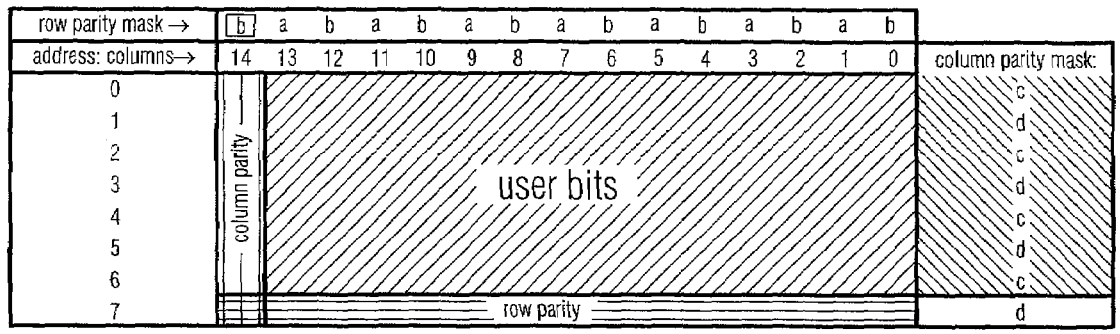
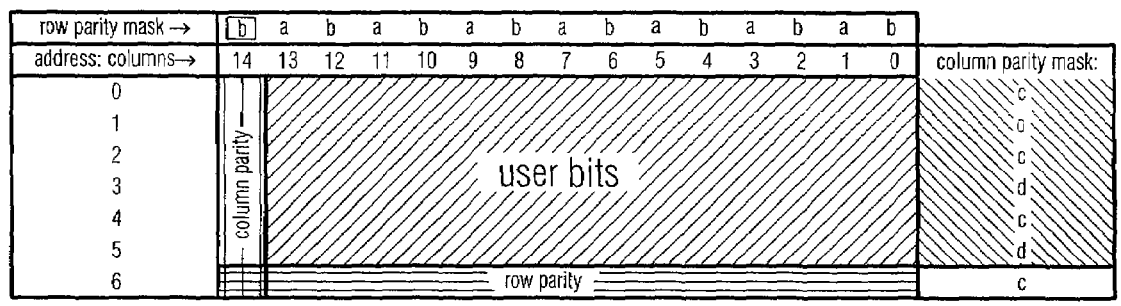

MEMORY ERROR DETECTION DEVICE AND METHOD FOR DETECTING A MEMORY ERROR

PRIORITY

This application claims priority from German Patent Application No. 10 2005 016 050.6, which was filed on Apr. 7, 2005, and is incorporated herein by reference in its entirety.

TECHNICAL FIELD

The present invention relates to the technical field of semiconductor memories, and particularly the present invention relates to the technical sub-field of checking the integrity of semiconductor memories for sensors, such as they are employed in automobile electronics.

BACKGROUND

Modern integrated sensors contain a small data memory of the size of 10 bits to 1000 bits to store the calibrating data of a sensor on the chip therewith. For automotive applications, high reliability is demanded so that it is required to guarantee the integrity of the data with known methods of error detecting and error correcting codes (FEC codes=forward error correcting codes).

Since the memory size is therefore very small as compared to data preservation systems common today and, on the other hand, reasons of economy force designers to implement a system as simple as possible, the matrix parity check is widely used as FEC method. In order to explain the matrix parity check in more detail, a memory 600 is symbolically illustrated in FIG. 6. The memory 600 has a word width of 16 bits, wherein the individual bits of the words are designated by the bit numbers 602, as illustrated in the row above memory 600 in FIG. 6 (i.e. the columns 0 to 15 designate the individual bits of the corresponding words). The memory 600 further includes an address area of 15 words, wherein each word may be written into a row 604, whereby the 15 words in the memory 600 may be addressed by the row address addr_i=0 . . . 14. The division into two data areas (user and precal data) may be ignored here. Row parity bits are stored on the address 0, corresponding column parity bits are stored on the column 15 indicated by the reference numeral 606. Furthermore, the designation "row parity" (reference numeral 608) represents the calculated parity per row (which, however, is not stored, but calculated when reading out a row). Likewise, "column parity" (reference numeral 601) represents the calculated parity per column (which is not stored either, but calculated when reading out the row).

The operation of the above matrix parity check may be described as follows. The calibrating data required for a sensor are programmed into the addresses 1 to 14 and the columns 0 to 14. Each word is provided with a parity bit, which is programmed in the column 15. The parity bit is to be selected so that the number of ones per row is even (=even parity). The parity row—i.e. the totality of all column parity bits—is stored in address 0; it is calculated so that the number of ones per column is also even. It is to be noted here that the parity of all cells of a column (i.e. for the rows 1 . . . 15) is referred to as column parity, and the parity of all cells of a row (i.e. for all columns 0 . . . 15 of a row) is referred to as row parity. In contrast, the row containing no data, but only column parity bits, i.e. which contain redundancy information for error detection and correction (stored in the address 0 in the example), is referred to as parity row. Analogously, the column containing no data, but only row parity bits containing redundancy information for error detection and/or correction (the column with the address 0 in the example) is referred to as parity column.

When reading out the data, the number of ones per column and row is counted. If it is odd, at least one bit in the corresponding row or column must be toggled, as it is illustrated, for example, in FIG. 7 with respect to the bit in column number 7 and row number 10. Technically, counting the number of ones in the whole memory is complicated. Therefore, only the number of ones per column is calculated continuously by combining the bits of a column with an EXCLUSIVE-OR gate (for example in the form of a hard-coded logic). This means that, for example, the bit of address 0, column 7 is combined with the bit of address 1, column 7, the bit of address 2, column 7, . . . , and the bit of address 14, column 7, by an EXCLUSIVE OR operation to achieve the bit in the column parity row (i.e. the bit number 7 of row 610) for column 7. Formally, such an operation may be illustrated as follows:

Bit (address 0, column 7) $\oplus$ bit (address 1, column 7) $\oplus$ . . . $\oplus$ bit (address 14, column 7)=column parity <7>.

Here, the symbol $\oplus$ means an XOR operation (=EXCLUSIVE-OR operation) equaling an addition modulo 2. If column parity <7>=0, the number of ones in column 7 is even, i.e. no bit error has been detected in this column.

If column parity <7>=1, the number of ones in column 7 is odd, i.e. a bit error has been detected in this column. When reading out a row—as marked by the highlighted address row 10 in FIG. 7—it is copied into a readout register 612, where all cells of this register are XORed (=EXCLUSIVE-ORed) to calculate the row parity. Formally, such an operation for determining the row parity bit 614 may be described by the following equation:

Row parity=bit<0>$\oplus$bit<1>$\oplus$ . . . $\oplus$bit<15>.

Furthermore, FIGS. 6 and 7 also illustrate how, in the case of an error detection (i.e. when row parity=1), a detected error may be corrected automatically. This is done by combining the row parity bit 614 with an error correction enable signal fec_en_i in an AND gate 616, wherein the error correction enable signal assumes a logic value of 1 when a forward error correction is to be performed. The signal resulting from the AND gate 616 is used as input signal of a further AND gate 618 at whose second input the values of the column parity 610 are applied so that, as output signal of the AND gate 618, a 16 bit wide word is output in which the places in the corresponding address row addr_i which are to be corrected are coded with a binary value of 1, while the places not to be corrected are coded with the binary value of 0. This output signal of the AND gate 618 is then supplied as an input signal to an EXCLUSIVE-OR gate 620, at the second input of which the 16 bit wide word from the register 612 is applied. A column-wise EXCLUSIVE-OR operation is performed, wherein the correspondingly toggled bits of the word stored in the register 612 may be corrected.

By way of illustration, it is again repeated that parity actually means the number of ones in a data word. There is even parity when this number is even, otherwise there is odd parity. The memory contents thus consist of payload data and additional parity bits.

In the example described above, the row on address 0 and, in all other addresses, the column 15 were parity bits. The payload data were located in the columns 0 . . . 14 and in the rows 1 . . . 14. The parity calculation includes the payload data plus parity bit plus parity mask.

The properties of the matrix parity check for error detection may be summarized as follows. Detection is guaranteed when one or two bits are toggled; if only one bit toggles, the parity in the respective row and column is not correct, if two bits in different columns and rows are toggled, all columns and rows indicate this by an incorrect parity in the corresponding rows and columns. If two bits in the same row are toggled, the row parity is correct, but the column parity is not. Something analogous also applies to the toggling of two bits in the same column. Even when three bits are toggled, at least one toggled bit is guaranteed to be detected as faulty.

In addition, a single toggled bit may even be corrected automatically, because its position may be determined by the incorrect row and column parity, it may be inverted when read out and thus the original state may be restored (=automatic error correction).

Such a method is thus very well suited to indicate small defects concerning only a few bits and maybe even eliminate them (i.e. when only one bit is toggled). Thus, failures resulting from small defect density problems common today may be eliminated.

However, the above-described method is problematic in that the failure of the whole memory or a sub-area of the memory with an even number of rows and columns may not be detected. In the following, such a sub-area of a memory is referred to as "even block".

Such a failure of an even block may be caused, for example, by a short circuit of all cells of a column to ground (=stuck-at-low) or to operational voltage (=stuck-at-high). It is also conceivable that the reading current for reading out the cells becomes too small or too large due to a defect, which may result in reading out all cells as digital "1" or digital "0". Possibly, the whole memory may unintentionally be programmed to "1" or "0" by an inadmissibly high ESD (electrostatic discharge) or EMV stress (EMV=electromagnetic compatibility).

A possible solution of such problems could be to ensure, by suitable coding of the data to be stored, that the memory contents "all 1" and/or "all 0" are no valid data set, i.e. that these memory contents are never programmed. An evaluating circuit would then have to continuously read out all data in operation and sum up the number of ones and zeros. If they exceed a set limit, this is detected as an error. This evaluating circuit, however, involves a lot of effort, is complicated and error-prone (because it has to perform a large number of operating steps operating sequentially), occupies relatively much space on the chip as compared to the small data memory and is further also inefficient, because it can only detect the completely deleted or set memory, but not the failure of an even block.

Furthermore, a problem is to protect a memory from unintentional overwriting, particularly when the memory is faulty and/or when an even block has failed. If, for example, a write protection of the memory is indicated by entering a binary value of 1 into a memory protection cell at a certain place in the memory, which is to signal a write protection of the memory, the memory marked as write-protected may not be recognized as such when the safe storage cell is in a row or column that comprises a stuck-at-low error. If then, for example, this error is not considered in reading out, the memory may inadvertently be reprogrammed, whereby, for example, data necessary for the functionality of a device in which the memory is installed are overwritten, so that the correct function of this device is no longer guaranteed, and/or as this function does no longer work due to the stuck-at-low/high error, the memory should not be reprogrammed in any case to allow an error analysis.

SUMMARY

It is the object of the present invention to provide a possibility to be able to detect an error occurring in connection with a write protection marking for a memory better than in prior art.

In accordance with a first aspect, the present invention provides a memory error detection device for a memory having memory cells arranged in memory rows and memory columns and having binary memory values, wherein a protection memory cell is arranged in a protection memory row or a protection memory column, wherein the memory is occupied such that the protection memory row or the protection memory column has a predetermined reference parity value in a state of integrity, wherein the reference parity value is chosen so that a row error or a column error in the protection memory row or the protection memory column representing a state of the protection memory cell signaling a write-protected state of the memory also results in the reference parity value, and wherein the memory error detection device has a comparator adapted to calculate a test parity value for the memory values of the protection memory row or the protection memory column read out by the reader and to compare it with a reference parity value expected for the protection memory row or the protection memory column.

In accordance with a second aspect, the present invention provides a method for detecting a memory error for a memory having memory cells arranged in memory rows and memory columns and having binary memory values, wherein a protection memory cell is arranged in a protection memory row or a protection memory column, wherein the memory is occupied such that the protection memory row or the protection memory column has a predetermined reference parity value in a state of integrity, wherein the reference parity value is chosen so that a row error or a column error in the protection memory row or the protection memory column representing a state of the protection memory cell signaling a write-protected state of the memory also results in the reference parity value, and wherein the method has the steps of calculating a test parity value from the memory values of the protection memory row or the protection memory column read out by the reader and comparing the calculated test parity value with a reference parity value expected for the protection memory row or the protection memory column.

In accordance with a third aspect, the present invention provides a memory occupation device for occupying a memory having memory cells, which are arranged in memory rows and memory columns and may store binary memory values, wherein a protection memory cell is arranged in a protection memory row or a protection memory column, wherein the device has a unit for determining adapted to determine the memory values to be written into the corresponding memory cells such that the memory is occupied such that the protection memory row or the protection memory column has a predetermined reference parity value in a state of integrity, wherein the reference parity value is to be chosen so that a row error or a column error in the protection memory row or the protection memory column representing a state of the memory cell signaling a write-protected state of the memory also results in the reference parity value; and a writer for writing the memory values determined by the unit into the corresponding memory cells of the memory.

In accordance with a fourth aspect, the present invention provides a method for occupying a memory having memory cells, which are arranged in memory rows and memory columns and may store binary memory values, wherein a protection memory cell is arranged in a protection memory row or a protection memory column, wherein the method has the steps of determining the memory values to be written into the corresponding memory cells such that the memory is occupied such that the protection memory row or the protection memory column has a predetermined reference parity value in a state of integrity, wherein the reference parity value is to be chosen so that a row error or a column error in the protection memory row or the protection memory column representing a state of the memory cell signaling a write-protected state of the memory also results in the reference parity value; and writing the determined memory values into the corresponding memory cells of the memory.

In accordance with a fifth aspect, the present invention provides a computer program having program code for performing the method for detecting a memory error for a memory having memory cells arranged in memory rows and memory columns and having binary memory values, wherein a protection memory cell is arranged in a protection memory row or a protection memory column, wherein the memory is occupied such that the protection memory row or the protection memory column has a predetermined reference parity value in a state of integrity, wherein the reference parity value is chosen so that a row error or a column error in the protection memory row or the protection memory column representing a state of the protection memory cell signaling a write-protected state of the memory also results in the reference parity value, when the computer program runs on a computer, and wherein the method has the steps of calculating a test parity value from the memory values of the protection memory row or the protection memory column read out by the reader and comparing the calculated test parity value with a reference parity value expected for the protection memory row or the protection memory column.

In accordance with a sixth aspect, the present invention provides a computer program having program code for performing the method for occupying a memory having memory cells, which are arranged in memory rows and memory columns and may store binary memory values, wherein a protection memory cell is arranged in a protection memory row or a protection memory column, when the computer program runs on a computer, wherein the method has the steps of determining the memory values to be written into the corresponding memory cells such that the memory is occupied such that the protection memory row or the protection memory column has a predetermined reference parity value in a state of integrity, wherein the reference parity value is to be chosen so that a row error or a column error in the protection memory row or the protection memory column representing a state of the memory cell signaling a write-protected state of the memory also results in the reference parity value; and writing the determined memory values into the corresponding memory cells of the memory.

In accordance with a seventh aspect, the present invention provides a memory error detection device for a memory having memory cells arranged in memory rows and memory columns and having binary memory values, wherein a protection memory cell is arranged in a protection memory row or a protection memory column, wherein the memory is occupied such that the protection memory row or the protection memory column has a predetermined reference parity value in a state of integrity, wherein the reference parity value is chosen so that a row error or a column error in the protection memory row or the protection memory column representing a state of the protection memory cell signaling a write-protected state of the memory also results in the reference parity value, and wherein the memory error detection device has a reader for reading out the binary memory values of the protection memory row or the protection memory column; a comparator adapted to calculate a test parity value for the memory values of the protection memory row or the protection memory column read out by the reader and to compare it with a reference parity value expected for the protection memory row or the protection memory column; and a detector adapted to take an error measure when the test parity value does not match the reference parity value.

In accordance with an eighth aspect, the present invention provides a method for detecting a memory error for a memory having memory cells arranged in memory rows and memory columns and having binary memory values, wherein a protection memory cell is arranged in a protection memory row or a protection memory column, wherein the memory is occupied such that the protection memory row or the protection memory column has a predetermined reference parity value in a state of integrity, wherein the reference parity value is chosen so that a row error or a column error in the protection memory row or the protection memory column representing a state of the protection memory cell signaling a write-protected state of the memory also results in the reference parity value, and wherein the method has the steps of reading out the binary memory values of the protection memory row or the protection memory column; calculating a test parity value from the memory values of the protection memory row or the protection memory column read out by the reader and comparing the calculated test parity value with a reference parity value expected for the protection memory row or the protection memory column; and taking an error measure when the test parity value does not match the reference parity value.

The present invention is based on the finding that a memory error may be detected when the memory, in a state of integrity, is occupied such that the protection memory row or the protection memory column in which the protection memory cell is arranged has a predetermined reference parity value in a parity value calculation, which is chosen so that a row error or a column error in the protection memory row or the protection memory column representing a state of the protection memory cell signaling a write-protected state of the memory also results in the reference parity value. If, for example, a binary value of 1 is used in the protection memory cell to signal that the memory is to be write-protected, the protection memory row or the protection memory column in which the protection memory cell is located is to be occupied such that the reference parity value of 1 also results when a "benign" error occurs in the protection memory row or the protection memory column. If, for example, a binary value of 1 is used in the protection memory cell to mark the memory as write-protected, a stuck-at-high error in the protection memory row or the protection memory column ("benign" error) should not signal an error, because, in this case, although there is an error, the memory is also recognized as write-protected by the stuck-at-high error. If a memory occupied in such a way for the state of integrity is used, a stuck-at-low error may be detected, for example, when a test parity value calculated from the read out memory values of the protection memory row or the protection memory column does not match the reference parity value. With respect to the example illustrated above, this would mean that a "malign" error (i.e. a stuck-at-low error that would signal a non-write-protected memory) would yield a test parity value of 0 for the protection memory row or the protection memory column. If, however, the binary value of 1 was chosen as reference parity value, there is thus a deviation between the reference parity value and the test parity value, whereby this "malign" error may be detected merely by the deviation of the reference parity value from the test parity value. In this case, an error measure may be taken, such as an output of a signal, which may provide an indication of an error in the protection memory row or the protection memory column or an indication of the evaluation of the memory as write-protected, although the memory should actually be evaluated as non-write-protected due to the value in the protection memory cell.

The present invention offers the advantage to detect the write protection of the memory not only based on the binary value in the protection memory cell, but to detect a possibly occurred error in the protection memory row or the protection memory column based on the calculated test parity value for the protection memory row or the protection memory column in connection with the corresponding reference parity value. If a "malign" error occurs, i.e. the memory is evaluated as non-write-protected by the stuck-at error, although correctly it would actually have to be considered as write-protected, this error is detected by the comparison of the test parity value with the reference parity value, whereby also such a faulty memory may be appropriately protected, such as by a post-evaluation of the memory as write-protected when the test parity value does not match the reference parity value. In this case, it may thus be advantageously prevented that, even by the failure of a single row and/or column that is exactly the protection memory cell, the memory is unintentionally evaluated as re-writable and thus the information stored in the memory (and/or in the still error-free memory rows and memory columns) is deleted or overwritten.

BRIEF DESCRIPTION OF THE DRAWINGS

Preferred embodiments of the present invention are explained in more detail in the following with respect to the accompanying drawings, in which:

FIG. 1C is a flow diagram of an embodiment of the inventive method for detecting a memory error;

FIG. 2 is a tabular representation for the occupation of the memory to be able to implement the inventive approach;

FIG. 3 is a further tabular representation to explain the occupation of the memory necessary to be able to employ the inventive approach;

FIG. 4 is a representation of a derivation for a calculation rule for the occupation of the memory to be able to implement the inventive approach;

FIG. 5 is a representation of a further occupation rule to occupy the memory so that the inventive approach may be employed;

DETAILED DESCRIPTION

Figure 1A:
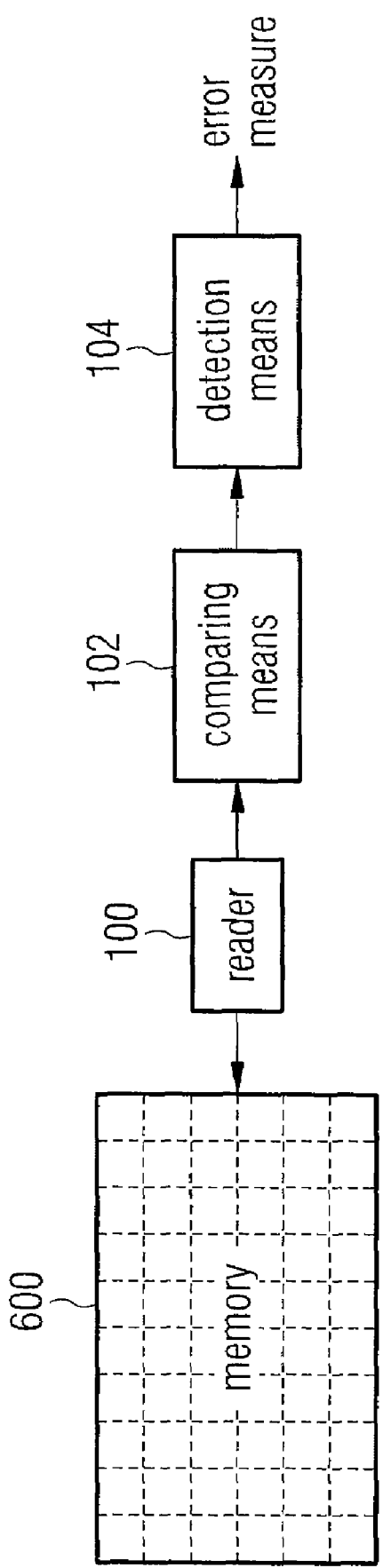
FIG. 1A is a block diagram of an embodiment of the inventive memory error detection device.

In the following description of preferred embodiments, like or similar elements are provided with the same or similar reference numerals, wherein a repeated description of these elements is omitted.

FIG. 1A shows a block circuit diagram of an embodiment of the inventive memory error detection device. The memory error detection device includes a reader 100 for reading out the binary memory values of the protection memory row or the protection memory column of the memory 600. The read out binary memory values are then transmitted to a comparing means 102 in which a test parity value is calculated from the read out memory values of the memory cells of the protection memory row or the protection memory column and is compared with a reference parity value expected for the protection memory row or the protection memory column. The result of the comparison between the test parity value and the reference parity value is then transmitted to a detection means 104, which may carry out and/or initiate an error measure when the test parity value does not match the reference parity value.

For the following operation of the inventive memory error detection device described in detail, four different cases are considered, wherein the errors stuck-at-high and stuck-at-low, respectively, are taken into account for the use of a high active lock bit (i.e. when using a binary value of 1 in the protection memory row for signaling the write-protected state of the memory 600) and a low active lock bit (i.e. the use of a binary value of 0 in the protection memory row for signaling the write-protected state of the memory 600), respectively.

If a high active lock bit is used, the binary value of 1 in the protection memory cell means a write-protected state of the memory. Consequently, the binary value of 0 in the protection memory row signals a non-write-protected, i.e. writable state of the memory 600. In this case, the parity of the protection memory row or the protection memory column should advantageously be performed by the corresponding setting of the parity bit in the protection memory row or the protection memory column such that, for the protection memory row or the protection memory column, the result is a parity value of 1 that is then the reference parity value. If there is a stuck-at-high error (i.e. all memory cells of the protection memory row or the protection memory column have the binary value of 1) and if a number of cells of the protection memory row and/or the protection memory column is odd, the result of the calculation of the test parity value is also a binary value of 1 for this test parity value, which then does not cause any error measure by the detection means 104 when compared to the reference parity value, because the reference parity value and the test parity value do not differ. For preventing an unintentional overwriting of the memory values stored in the memory 600, however, taking an error measure for this stuck-at error is not required, because the memory is already to be considered as write-protected ("benign" error). However, this is different in a memory having an even number of cells of the protection memory row and/or the protection memory column. In this case, the calculation of the test parity value would result in a binary value of 0 for this test parity value, whereby the test parity value differs from the reference parity value and thus triggers an error measure. In the case of a stuck-at-low error, i.e. when all cells of the protection memory row and/or the protection memory column are occupied with the binary value of 0, the calculation of the test parity value results in a value of 0 for the same, whereby this stuck-at-low error of the protection memory row or the protection memory column may be detected when comparing the test parity value with the reference parity value and an error measure may be taken correspondingly. In this case, an error in the memory may be detected in spite of the value of 0 "stored" in the protection memory cell, which signals a non-write-protected memory, whereby there is a possibility to protect the memory from unintentional overwriting also in such a state ("malign" error).

Analogously, there may also be observed the selection of a low active lock bit in which a binary value of 1 in the protection memory cell signals a non-write-protected memory. For such a case, the memory should be occupied such that the result for the protection memory row or the protection memory column is a parity value of 0, which is then, in turn, the reference parity value. If a stuck-at-low error occurs ("benign" error, because a binary value of 0 in the protection memory cell signals a write-protected state of the memory), the result is also a test parity value of 0 that does not require any error measure, because the memory is already to be considered as write-protected. If a stuck-at-high error occurs and the protection memory row or the protection memory column has an odd number of cells, the calculation of a test parity value results in a value of 1 for the same, whereby there may again be detected a difference between the test parity value and the reference parity value by the detection means 104, which may then also take and/or initiate the error measure. However, what remains problematic is the case of a stuck-at-high error for the selection of a low active lock bit in the protection memory cell with an even number of cells of the protection memory row or the protection memory column, because, in this case, the calculation of the test parity value results in a binary value of 0 for the same, whereby not even a comparison between the test parity value and the reference parity value can detect a row or column error, but a binary value of 1 is contained in the protection memory cell, which signals a non-write-protected memory. However, this problem may be solved when only one memory is used that includes an odd number of cells in the protection memory row or the protection memory column which is used for the calculation of the test parity value, or when an evaluation is done via a protection memory row and a protection memory column. In this case, either the protection memory row or the protection memory column should also comprise an odd number of cells. In this case, a stuck-at error will thus always be detected and/or a "benign" error will always be ignored, irrespective of whether there is a stuck-at-high error or a stuck-at-low error.

Figure 1B:
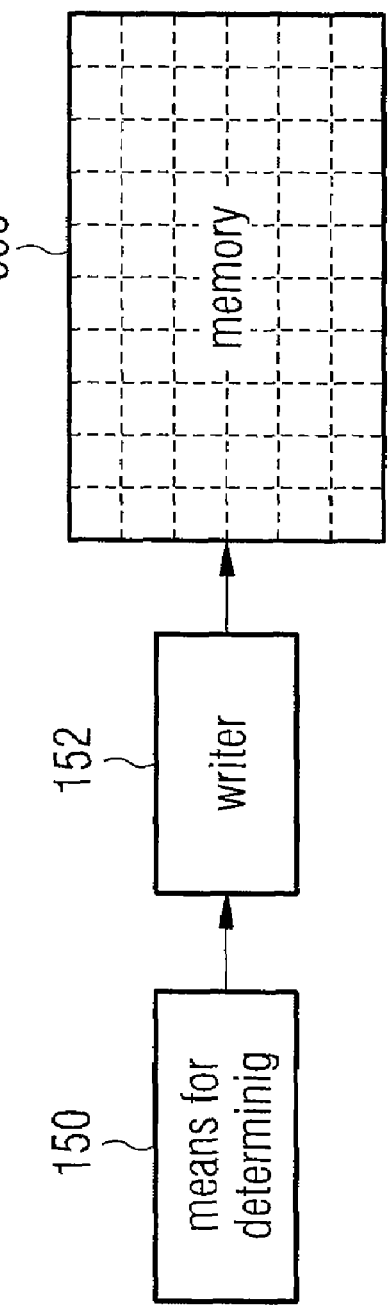
FIG. 1B is a block circuit diagram of an embodiment of the inventive memory occupation device.
Figure 6:
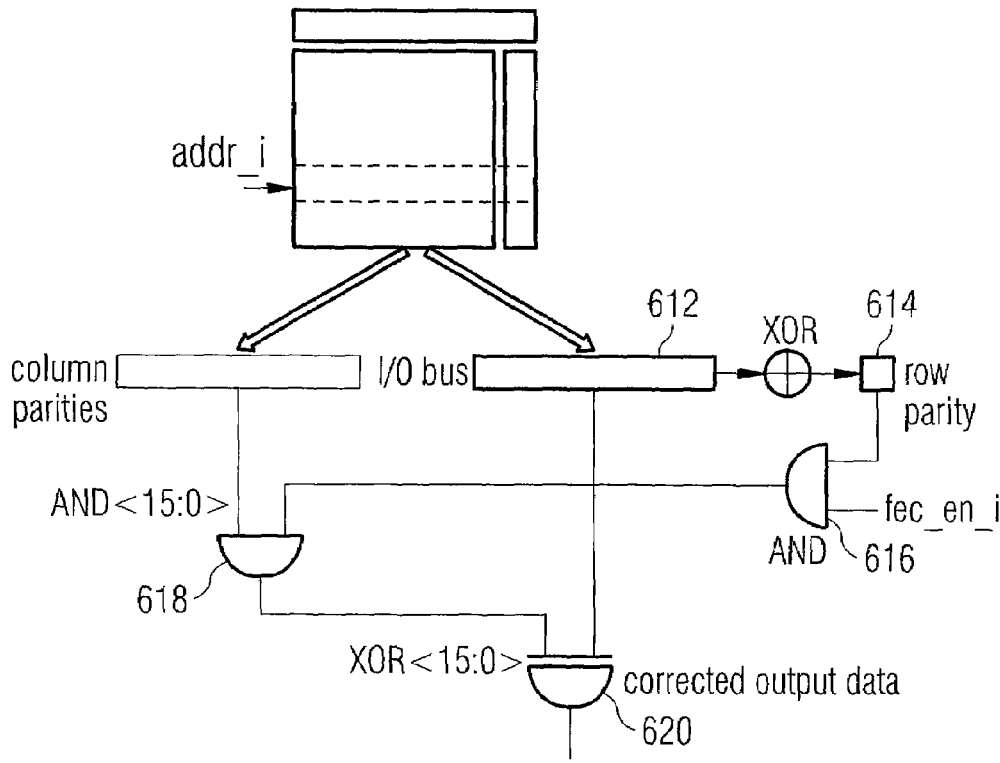
FIG. 6 is a representation of a memory occupation according to a conventional approach and a representation of a block diagram for the correction of a single bit error in the occupation of the memory.
Figure 7:
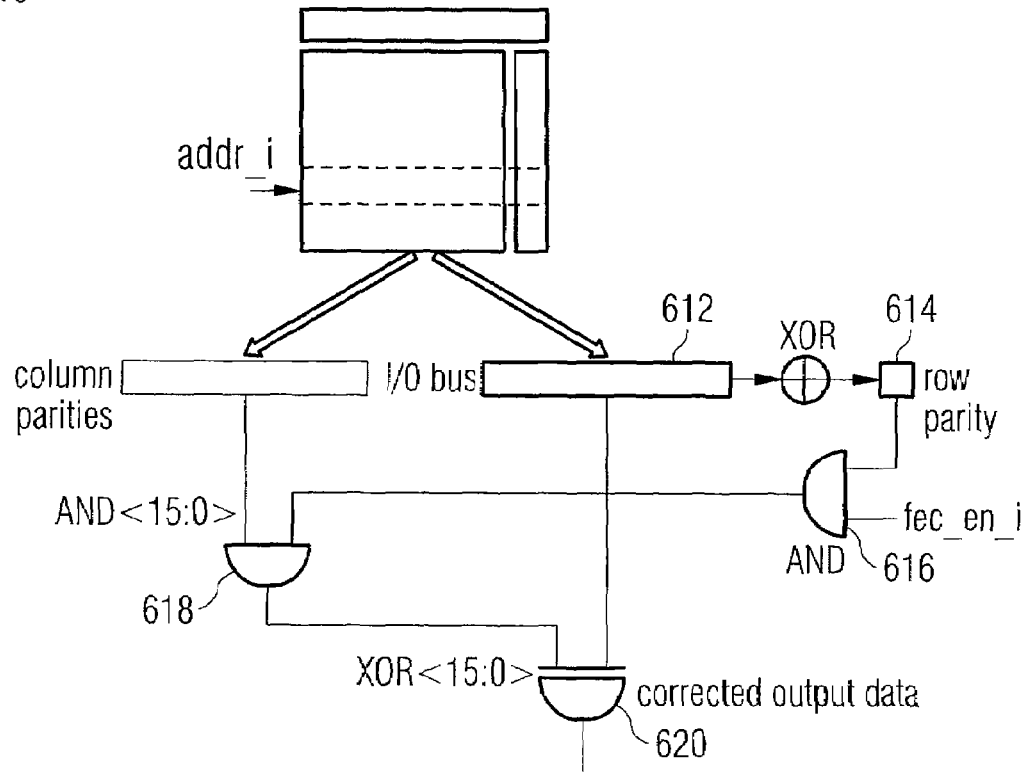
FIG. 7 is a representation how the occurrence of a single bit error in the memory affects the corresponding column and row parities and a block diagram for the correction of a correspondingly occurred single bit error.

FIG. 1B shows a block circuit diagram of the embodiment of the inventive memory occupation device. The memory occupation device includes means 150 for determining memory values to be written into the corresponding memory cells such that the protection memory row or the protection memory column has a predetermined reference parity value in a state of integrity, wherein the reference parity value is chosen so that a row error or a column error in the protection memory row or the protection memory column representing a state of the protection cell signaling a write-protected state of the memory also results in the reference parity value. Furthermore, the memory occupation device includes a writer 152 receiving the memory values determined by the means 150 for determining and writing them into the memory 600. The means 150 for determining may be selected such that a binary value of 1 in a memory cell is to signal a write-protected state of the memory 600, wherein the protection memory row or the protection memory column is to be occupied such that the result for the protection memory row or the protection memory column is preferably a parity value that also has the binary value of 1 and then serves as reference parity value. Alternatively, there may also be used a binary value of 0 in the protection memory cell to signal the write-protected state of the memory 600. In this case, the means 150 for determining should be designed such that the protection memory row or the protection memory column also yields a parity value of 0 when calculating a parity value. In this way, the memory 600 may be occupied such that a stuck-at error in the protection memory row or the protection memory column is considerably easier to detect as compared to prior art.

FIG. 1C shows a flow diagram of an embodiment of the inventive method for detecting a memory error. In a first step 180, the memory values of the protection memory row or the protection memory column are read out. Subsequently, a next step 182 comprises calculating a test parity value from the read out memory values of the protection memory row or the protection memory column. A subsequent method step 184 comprises comparing the test parity value calculated in step 182 with a reference parity value. If the test parity value corresponds to the reference parity value, i.e. if the test parity value is identical to the reference parity value, for example, an error measure may be taken in a further method step 186. If step 184 of comparing the test parity value with the reference parity value determines that the test parity value is identical to the reference parity value ("benign" error and/or error-free memory), a further step 188 may check whether the memory value stored in the protection memory cell is in a predetermined relationship to the test parity value. This also allows to detect whether the memory is error-free and in a write-protected or in a non-write-protected state. If the memory is in the write-protected state, there may be no further writing of memory values into the memory. If the memory is not in the write-protected state, i.e. if the memory value in the protection memory cell is not in the predetermined relationship to the test parity value, there may be writing of memory values into the memory cells of the memory (step 192). If the result of the checking in step 188 is that the memory value stored in the protection memory cell is in the predetermined relationship to the test parity value, the memory is to be considered as write-protected, which may, for example, be possible by the output of a corresponding message (step 190). The predetermined relationship between the memory value stored in the protection memory cell and the test parity value may be an identity, i.e. an equality. Alternatively, however, the predetermined relationship may also consist in an inequality, for example for another test parity value calculation rule, wherein in this case a writing of memory values into the memory cells of the memory is done when the memory value stored in the protection memory cell is equal to the test parity value, and that the memory is considered to be write-protected when the memory value stored in the protection memory cell is unequal to the calculated test parity value.

Figures 2, 3:
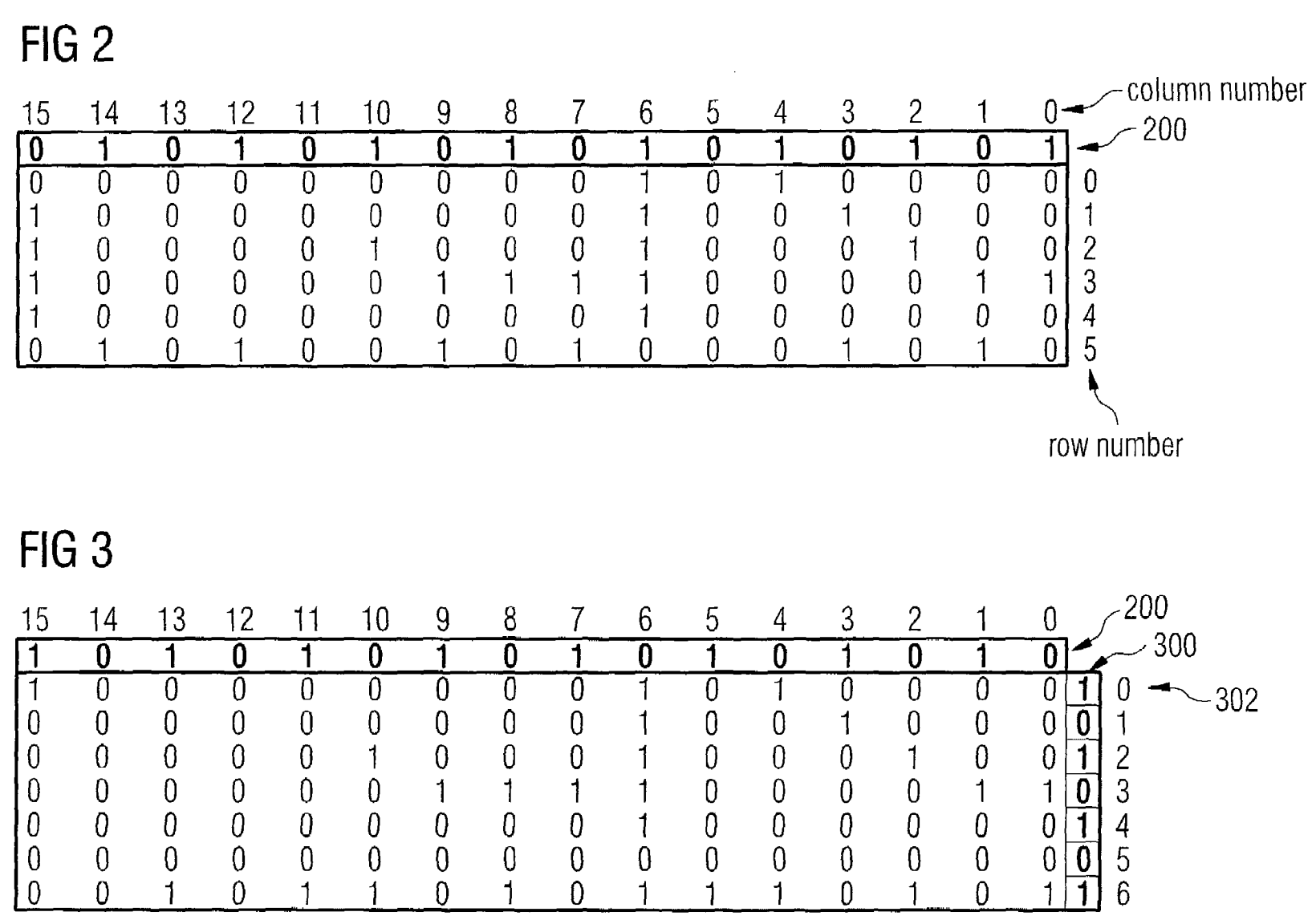

FIG. 2 shows a memory having 16 columns and 6 rows. The columns are provided with column numbers in the top row. The rows are provided with row numbers in the column on the very right. In the second row, the alternating bits of the parity mask are entered in bold characters, which define that the columns 15, 13, . . . , one are to be calculated with even parity and the columns 14, 12, . . . , 2, 0 are to be calculated with odd parity. Column 15 and row 5 are again the parity bits stored in the memory itself, which are chosen so that, for example, in column 15 the number of ones is even, whereas it is odd in column 14.

If the parity mask bit is equal to 1, the column is provided with odd parity; if the parity mask bit is equal to 0, the column is calculated with even parity. This alteration with respect to prior art does not require any additional chip area, because the EXOR gates (EXOR=EXCLUSIVE OR) of address 0 present in the memory matrix are applied to the value of the bit with one input and to the value of the parity mask with the second input. In contrast, the second input in prior art is always on the logic value LOW. As an example, there may be illustrated by way of formula the determination of the memory entries for the fifth column:

$$\text{Column parity}<5> = \text{parity mask}<5> \oplus \text{bit(address 0, column 5)} \oplus \text{bit(address 1, column 5)} \oplus \ldots \oplus \text{bit(address 5, column 5)}.$$

If there is a defect in the whole memory, so that all bits are read out to 0, this is detected in the calculation of the column parity of the columns 14, 12, 10, . . . , 2, 0, because the number of ones in these columns does not have an odd value, because all bits have the binary value 0. Even if only a single column fails with "stuck-at-low", this is detected as long as the column has an even number (i.e. an odd parity). However, odd columns are not detected in that way. Homogeneous blocks of "stuck-at-low" failures, however, are sure to be detected when they involve at least two columns.

The case is similar when a column fails due to a "stuck-at-high" error, because this is detected for odd columns (i.e. for those with even parity), but not for single columns with odd parity, but is detected when homogeneous blocks of at least two columns fail. This alternating parity coding is thus rather powerful, because it detects all failures of two or more (preferable adjacent) columns and half of all possible failures of single columns.

There may also further be performed a detection of defect rows in an analogous way, as it is possible by means of the parity mask for the columns. For this, a corresponding parity mask for the corresponding rows would have to be used analogously.

In order to be able to simultaneously also detect failures of rows besides failures of columns, the concept introduced above may also be extended such that both columns and rows are provided with alternating parity. Such an approach is illustrated by way of example in tabular form in FIG. 3, wherein a parity mask 300 for the rows is also used in addition to the parity mask 200 for the columns. The top row of the memory, indicated by the reference numeral 302 in FIG. 3, for example, has a parity mask with a binary value of 1 and is thus calculated with odd parity, i.e. the number of ones in this row has to be odd. However, only the programmed bits including the parity bit in column 15 count for this, i.e. the logic value of 1 of the parity mask is excluded. If two or more adjacent rows show "stuck-at-high" or "stuck-at-low" failures, this is detected by the incorrect parity. A single row is detected when it shows a stuck-at-low failure and is to have odd parity at the same time (wherein in this case there is always indicated an error) and/or when it shows a "stuck-at-high" failure and, at the same time, is to have even parity, which is only satisfied for an odd number of bits in a row. In the case of an even number of bits in a row, the parity is even for stuck-at-high errors, wherein in that case no error can be detected based on the parity of the corresponding row. For generalization, this may be represented as follows: If the parity mask is 1, a stuck-at-low error is sure to be detected; a stuck-at-high error, however, is only detected in the case of an even number of bits in the corresponding row/column, but not in the case of an odd number. If the value of the parity mask in the corresponding row/column is 0, a stuck-at-low error in this row/column alone is detectable neither for an even nor an odd number, but a stuck-at-high error is detected for an odd, but not for an even number.

The alternating row parity calculation may again be realized in a very simple and inexpensive way by also adding the inverted LSB (least significant bit) of the row address in the modulo 2 addition of all bits of a row. This may be illustrated by the following formula:

$$\text{row parity} = \text{NOT}(\text{address}<0> \oplus \text{bit}<0> \oplus \text{bit}<1> \oplus \ldots \oplus \text{bit}<15>).$$

However, the row parity mask and the column parity mask cannot be selected arbitrarily, but have to be coordinated with each other. This is described in more detail in the following with respect to FIGS. 4 and 5. Essentially, the coordination of the row parity mask and the column parity mask concerns the field in the cross point of the row and column parities. This parity bit may be calculated in two ways. On the one hand, it has to satisfy the parity condition of the row, on the other hand the parity condition of the column. Both conditions may not contradict each other. That can only be achieved when the parity masks follow the conditions derived below.

In FIG. 4, the top part illustrates a first case for a memory comprising an even number of columns and an odd number of rows. The field that may be occupied by user data bits is indicated by hatching from bottom left to top right. On the right side, the column parity mask is illustrated, which is indicated by hatching from top left to bottom right. On the left side, column no. 15 is formed as column parity and indicated by vertical hatching. Those bits are stored into the memory cells of columns 15 that are necessary in an EXCLUSIVE-OR operation of the user data bits for a row to achieve the corresponding bit (i.e. c or d) of the column parity mask. Furthermore, those binary values are stored into the memory cells of row 6 that are necessary in an EXCLUSIVE-OR operation of the memory values of the individual columns to achieve the values a or b of the corresponding row parity mask, as illustrated in the top row of the upper part of FIG. 4. It can be seen from the schematic representations in portion 400 of FIG. 4 how the individual values in the corresponding fields are calculated, wherein the sign $\oplus$ symbolizes a modulo 2 addition. The result is that, in the case of an even number of columns and an odd number of rows, the parity mask for the parity row has to have the logic value 1, i.e. that the value has to be c=1.

The lower part of FIG. 4 illustrates the case in which the memory comprises an even number of columns and an even number of rows. In this case, the calculation has the result that there is no constraint for the parity masks for an even number of columns and rows, i.e. that both the logic values 1 or 0 are possible for the values a and b, and c and d, but with the limitation that a and b differ from each other and c and d also differ from each other.

With respect to a third case in which the memory has an odd number of columns and an even number of rows, the above calculation has the result that the parity mask in the parity column has to have a logic value of 1. This has the result that the variable b has to assume a logic value of 1. Such a case is illustrated in the upper part in FIG. 5.

In FIG. 5, the lower part finally illustrates the fourth case in which a memory has an odd number of columns and an odd number of rows. The calculation with respect to the fourth case has the result that a solution may only be found when the variable a has a value equal to the value of the variable d, and, at the same time, the variable b has a value identical to the value of the variable c. This means that either a=1, b=0, c=0 and d=1, or a=0, b=1, c=1 and d=0.

This results in the general rule that the parity mask in the parity row and in the parity column should assume a logic value 1. This works for all four different cases, as illustrated above. Other solutions are also possible for individual variants—as derived in detail above, they do not work, however, for all four cases at the same time.

The row parity does not have to be in the uppermost address either, but may, for example, also be on the address 3 or any other address in the memory. The column parity also does not have to be in the most significant column, but may, for example, also be entered in column 8 or any other column.

Finally, it can be noted that a possible lock bit for blocking a write operation to the memory should preferably be placed in rows with a certain parity. A lock bit is provided for irreversibly locking the memory after programming the lock bit, so that, for example, no unintentional reprogramming can be performed after the calibration of the sensor. If such a lock bit is to lock for a logic value of 1 (i.e. is to be high active), it should be in a row having an odd parity and should also be located in a column also having an odd parity. Alternatively, the lock bit may also only be located in a row having odd parity and may not be located in a column having odd parity, wherein in that case there is only a protection against a failure of the respective row, but not a protection against the failure of the corresponding column. Something analogous also applies to the arrangement of the lock bit in a corresponding column having odd parity and a row not having odd parity. Thus, if later on a whole row or column fails (i.e. has a stuck-at-low or a stuck-at-high error), this failure will be detected if the row and/or column only has a binary value of 0 in the memory cells (i.e. if the memory were not write-protected). However, if a stuck-at-high error occurs in the corresponding row or column, this would have the result that the integrated circuit is considered to be write-protected and at least cannot be reprogrammed unintentionally any more. Something analogous also applies the other way round, i.e. if a lock bit is to lock for a binary value of 0 (i.e. is to be low active), it should be in a row and column that both have even parity and an odd number of cells per column/row.

Depending on the circumstances, the inventive method for detecting a memory error or the method for occupying a memory may be implemented in hardware or in software. The implementation may be done on a digital storage medium, particularly a floppy disk or a CD with control signals that may be read out electronically, which may cooperate with a programmable computer system so that the corresponding method is executed. Generally, the invention thus also consists in a computer program product with a program code stored on a machine-readable carrier for performing the inventive method when the computer program product runs on a computer. In other words, the invention may thus be realized as a computer program with a program code for performing the method, when the computer program runs on a computer.

In summary, it may be noted that the invention essentially consists in extending a matrix parity check by associating alternating and/or at least two different parity values with the columns and/or rows. This makes it possible to detect failures of whole rows and whole columns. Such a parity value distribution is implemented by, for example, adding a parity mask modulo 2 to the sum of the column bits and adding the inverted or non-inverted LSB of the address to the sum of the row bits modulo 2.

Furthermore, a high active lock bit may also be accommodated in a row and column with odd parity, or a low active lock bit may be accommodated in a row and/or column with even parity.

The core of the present invention is thus that the parity mask contains both ones and zeros for the same calculation rule or contains equal values for a different calculation rule. Preferably, these values and/or calculation rules may be alternately allocated to consecutive rows/columns. In the described example, the row with the address 0 was chosen as parity row, the column 15 was chosen as parity column. In contrast, the term "row parity" refers to the result of the calculation of the parity of, for example, a whole row (including the parity bit in this row). Analogously, the term "column parity" refers to the result of the calculation of, for example, a whole column including the parity bit in the corresponding column.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A memory error detection device for a memory having memory cells arranged in memory rows and memory columns and having binary memory values, wherein at least respective memory rows or respective memory columns have associated therewith a parity bit, wherein a protection memory cell is arranged in a protection memory row of said memory rows or a protection memory column of said memory columns, wherein a first state of the protection memory cell indicates that the memory is write-protected and a different second state of the protection cell indicates that the memory is not write-protected, wherein at least a state of a parity bit of the protection memory row or the protection memory column is chosen such that the protection memory row or the protection memory column has a predetermined reference parity value in a state of integrity, wherein said predetermined reference parity value is chosen so that a row error or a column error in the protection memory row or the protection memory column representing a state of the protection memory cell signaling a write-protected state of the memory also results in the reference parity value;

wherein said predetermined reference parity value is different from a parity value obtained for the protection memory row or the protection memory column when respective cells in the protection memory row or the protection memory column are in the second state; and wherein the memory error detection device comprises a comparator adapted to calculate the parity value for the protection memory row or the protection memory column and to compare the calculated parity value with said predetermined reference parity value.

2. A memory error detection device according to claim 1, further comprising a detector adapted to take an error measure when the calculated parity value does not match the predetermined reference parity value.

3. A memory error detection device according to claim 2, wherein the detector is adapted to check whether the memory value stored in the protection memory cell is in a predetermined relationship to the reference parity value, when the calculated parity value matches the reference parity value, wherein the detector is further adapted to recognize the memory as write-protected when the memory value stored in the protection memory cell is in the predetermined relationship to the reference parity value.

4. A memory error detection device according to claim 2, wherein the detector is adapted to provide, as an error measure, an output of a signal providing an indication of an error in the protection memory row or the protection memory column or an indication of a write-protected state of the memory.

5. A memory error detection device according to claim 2, wherein the detector is further adapted to consider the memory as write-protected when the reference parity value is identical to the memory value stored in the protection memory cell.

6. A memory error detection device according to claim 2, wherein the detector is further adapted to write memory values into the memory cells of the memory when the reference parity value is not identical to the memory value stored in the protection memory cell.

7. A memory error detection device according to claim 2, further comprising a reader for reading out the binary memory values of the protection memory row or the protection memory column.

8. A memory error detection device according to claim 7, wherein respective memory rows have associated therewith a row parity bit and respective memory columns have associated therewith a column parity bit, wherein states of a row parity bit of the protection memory row and of a row parity bit of the protection memory column are chosen such that a row error and a column error in the protection memory row and the protection memory column representing a state of the protection memory cell signaling a write-protected state of the memory also results in the reference parity value; wherein the reader is adapted to read out the memory cells of the protection memory row and the memory cells of the protection memory columns; wherein the comparator is adapted to calculate a respective parity value for the protection memory row and for the protection memory column, and to compare the calculated parity value for the protection memory row with the predetermined reference parity value for the protection memory row, and to compare the calculated parity value for the protection memory column with the predetermined reference parity value for the protection memory column, and wherein the detector is adapted to take an error measure at least when the calculated parity value of the protection memory row does not match the predetermined reference parity value of the protection memory row or when the calculated parity value of the protection memory column does not match the predetermined reference parity value of the protection memory column.

9. A memory error detection device according to claim 7, wherein states of parity bits of the protection memory row and a further memory row are chosen such that the reference parity value of the further memory row differs from the reference parity value of the protection memory row, when the same parity value calculation rules are used, or is equal, when different parity value calculation rules are used; or states of parity bits of the protection memory column and a further memory column are chosen such that the reference parity value of the further memory column differs from the reference parity value of the protection memory column, when the same parity value calculation rules are used, or is equal, when different parity value calculation rules are used;

wherein the reader is further adapted to read out the memory values of the further memory row or the memory values of the further memory column;

wherein the comparator is adapted to calculate a further parity value from the read out memory values of the further memory row or to calculate a further parity value from the read out memory values of the further memory column, and to compare the calculated further parity value for the further memory row with the calculated parity value for the protection memory row, or to compare the calculated further parity value for the further memory column with the calculated parity value for the protection memory column; and wherein a detector is adapted to take the error measure when the calculated further parity value for the further memory row is equal to the calculated parity value of the protection memory row, when the same parity value calculation rules are used, or is different, when different parity value calculation rules are used, or when the calculated further parity value of the further memory column and the calculated parity value of the protection memory column are equal, when the same parity value calculation rules are used, or is different, when different parity value calculation rules are used.

10. A memory error detection device according to claim 2, wherein the parity bit of the protection memory row or the protection memory column has a reference parity value of 1 in the state of integrity, and wherein the detector is adapted to take the error measure when the calculated parity value does not have the value of 1.

11. A memory error detection device according to claim 2, wherein the parity bit of the protection memory row or the protection memory column has a reference parity value of 0 in the state of integrity, and wherein the detector is adapted to take the error measure the calculated parity value does not have the value of 0.

12. A memory error detection device according to claim 1, wherein the comparator is adapted to read out the reference parity value from a reference parity value memory.

13. A method for detecting a memory error for a memory having memory cells arranged in memory rows and memory columns and having binary memory values, wherein at least respective memory rows or respective memory columns have associated therewith a parity bit, wherein a protection memory cell is arranged in a protection memory row of said memory rows or a protection memory column of said memory columns, wherein a first state of the protection memory cell indicates that the memory is write-protected and a second different state of the protection cell indicates that the memory is not write-protected, wherein at least a state of a parity bit of the protection memory row or the protection memory column is chosen such that the protection memory row or the protection memory column has a predetermined reference parity value in a state of integrity, wherein said predetermined reference parity value is chosen so that a row error or a column error in the protection memory row or the protection memory column representing a state of the protection memory cell signaling a write-protected state of the memory also results in the reference parity value, wherein said predetermined reference parity value is different from a parity value obtained for the protection memory row or the protection memory column when all cells in the protection memory row or the protection memory column are in the second state; and wherein the method comprises:

calculating a parity value from the memory values of the protection memory row or the protection memory column read out by a reader; and comparing the calculated parity value with said predetermined reference parity value.

14. A method according to claim 13, further comprising:

reading out the binary memory values of the protection memory row or the protection memory column; and taking an error measure when the calculated parity value does not match the predetermined reference parity value.

15. A computer program product having stored thereon program code executable on a computer for performing a method according to claim 13.

16. A memory occupation device for occupying a memory having memory cells, which are arranged in memory rows and memory columns and may store binary memory values, wherein at least respective memory rows or respective memory columns have associated therewith a parity bit, wherein a protection memory cell is arranged in a protection memory row of said memory rows or a protection memory column of said memory columns, wherein a first state of the protection memory cell indicates that the memory is write-protected and a second state of the protection cell indicates that the memory is not write-protected, wherein the device comprises:

a unit for determining adapted to determine a value to be written into the parity bit such that the memory is occupied such that the protection memory row or the protection memory column has a predetermined reference parity value in a state of integrity, wherein said predetermined reference parity value is to be chosen so that a row error or a column error in the protection memory row or the protection memory column representing a state of the memory cell signaling a write-protected state of the memory also results in the reference parity value; wherein said predetermined reference parity value is different from a parity value obtained for the protection memory row or the protection memory column when all cells in the protection memory row or the protection memory column are in the second different state; and a writer for writing the value determined by the unit into the parity bit.

17. A method for occupying a memory having memory cells, which are arranged in memory rows and memory columns and may store binary memory values, wherein at least respective memory rows or respective memory columns have associated therewith a parity bit, wherein a protection memory cell is arranged in a protection memory row of said memory rows or a protection memory column of said memory columns, wherein a first state of the protection memory cell indicates that the memory is write-protected and a second different state of the protection cell indicates that the memory is not write-protected, wherein the method comprises:

determining the value to be written into the parity bit such that the memory is occupied such that the protection memory row or the protection memory column has a predetermined reference parity value in a state of integrity, wherein said predetermined reference parity value is to be chosen so that a row error or a column error in the protection memory row or the protection memory column representing a state of the memory cell signaling a write-protected state of the memory also results in the reference parity value, wherein said predetermined reference parity value is different from a parity value obtained for the protection memory row or the protection memory column when all cells in the protection memory row or the protection memory column are in the second state; and writing the determined value into the parity bit.

18. A computer program product having stored thereon program code executable on a computer for performing a method according to claim 17.

* * * * *

UNITED STATES PATENT AND TRADEMARK OFFICE
CERTIFICATE OF CORRECTION

PATENT NO. : 7,565,602 B2  
APPLICATION NO. : 11/278886  
DATED : July 21, 2009  
INVENTOR(S) : Udo Ausserlechner It is certified that error appears in the above-identified patent and that said Letters Patent is hereby corrected as shown below:

Column 16, claim 11, line 11; please replace "error measure the" with --error measure when the--

Signed and Sealed this

Twenty-second Day of December, 2009

David J. Kappos  
*Director of the United States Patent and Trademark Office*